(12) United States Patent
Perlman

(10) Patent No.: US 7,409,545 B2
(45) Date of Patent: Aug. 5, 2008

(54) EPHEMERAL DECRYPTION UTILIZING BINDING FUNCTIONS

(75) Inventor: Radia J. Perlman, Sammamish, WA (US)

(73) Assignee: Sun MicroSystems, Inc., Santa Clara, CA (US)

( * ) Notice: Subject to any disclaimer, the term of this patent is extended or adjusted under 35 U.S.C. 154(b) by 790 days.

(21) Appl. No.: 10/665,386

(22) Filed: Sep. 18, 2003

(65) Prior Publication Data

US 2005/0066175 A1   Mar. 24, 2005

(51) Int. Cl.
   *H04L 9/00*   (2006.01)
(52) U.S. Cl. .................. 713/164; 713/165; 713/176; 713/180; 713/181; 713/189; 713/193; 380/28; 380/30; 380/277; 380/278; 380/282
(58) Field of Classification Search ........... 713/55–156, 713/158, 170–171, 174, 180–181, 189, 164, 713/165, 167, 176, 193; 726/2, 3, 5, 10, 726/18–19; 380/228, 239, 37, 277, 378–379, 380/281–286, 45, 28–30, 278
See application file for complete search history.

(56) References Cited

U.S. PATENT DOCUMENTS

| 5,347,580 A | | 9/1994 | Molva et al. |
|---|---|---|---|
| 5,491,750 A | | 2/1996 | Bellare et al. |
| 5,606,617 A | * | 2/1997 | Brands ............ 380/30 |
| 5,737,419 A | | 4/1998 | Ganesan |
| 5,812,669 A | | 9/1998 | Jenkins et al. |
| 6,009,173 A | | 12/1999 | Sumner |
| 6,044,462 A | | 3/2000 | Zubeldia et al. |
| 6,055,314 A | | 4/2000 | Spies et al. |
| 6,185,685 B1 | | 2/2001 | Morgan et al. |
| 6,240,187 B1 | | 5/2001 | Lewis |

(Continued)

FOREIGN PATENT DOCUMENTS

GB   2 402 852 A   12/2004

(Continued)

OTHER PUBLICATIONS

Menezes, Alfred J., Van Oorschot, Paul C., and Vanstone, Scott A., "Handbook of Applied Cryptography", CRC Press, Oct. 1996, pp. 475 and 487.

(Continued)

*Primary Examiner*—Kimyen Vu
*Assistant Examiner*—Beemnet W Dada
(74) *Attorney, Agent, or Firm*—Chapin IP Law, LLC; Barry W. Chapin, Esq.

(57) ABSTRACT

A method and system is disclosed for utilizing an ephemeral encryption or decryption agent so as to preclude access by the ephemeral encryption agent or decryption agent, respectively, to the information being ephemerally encrypted or decrypted. To preclude access by the ephemeral encryption agent, a blinding function is applied to the information prior to forwarding such information to the encryption agent for encryption. To preclude access to the information by the ephemeral decryption agent, a blinding function is applied to the encrypted information prior to forwarding the encrypted information to the decryption agent for decryption. Once the information has been returned, the information is unblinded, leaving an encrypted or decrypted message respectively.

42 Claims, 7 Drawing Sheets

U.S. PATENT DOCUMENTS

| | | | |
|---|---|---|---|
| 6,246,970 | B1 | 6/2001 | Silverbrook et al. |
| 6,278,783 | B1 * | 8/2001 | Kocher et al. ............... 380/277 |
| 6,308,277 | B1 | 10/2001 | Vaeth et al. |
| 6,363,480 | B1 * | 3/2002 | Perlman .................... 713/164 |
| 6,367,019 | B1 | 4/2002 | Ansell et al. |
| 6,877,092 | B2 * | 4/2005 | Chandersekaran et al. .. 713/151 |
| 7,016,499 | B2 * | 3/2006 | Perlman .................... 380/281 |
| 7,082,536 | B2 * | 7/2006 | Filipi-Martin et al. ....... 713/171 |
| 7,178,030 | B2 * | 2/2007 | Scheidt et al. ............. 713/176 |
| 2002/0136410 | A1 | 9/2002 | Hanna et al. |
| 2003/0059041 | A1 * | 3/2003 | MacKenzie et al. .......... 380/28 |
| 2003/0161472 | A1 | 8/2003 | Tong et al. |
| 2004/0133781 | A1 * | 7/2004 | Guillou ..................... 713/170 |

FOREIGN PATENT DOCUMENTS

| | | |
|---|---|---|
| WO | WO0120836 A2 | 3/2005 |

OTHER PUBLICATIONS

Gemplus, "Data Sheets of Gemplus", date unknown.

McNamara, "E-mail that Disappears", http://www.nwfusion.com/archive/1999b/0830netbuzz.html, Aug. 30, 1999, 4 pages.

Menezes, et al., "Handbook of Applied Cryptography", CRC Press, 1997, 581-86.

Schlumberger, "Data Sheets of Schlumberger", date unknown.

* cited by examiner

| | 14 | 16 | 18 | 20 | 22 |
|---|---|---|---|---|---|
| EKP1 | Pub-Key$_1$ | Priv-Key$_1$ | Expiration Time$_1$ | Key Id$_1$ | Other Data |
| EKP2 | Pub-Key$_2$ | Priv-Key$_2$ | Expiration Time$_2$ | Key Id$_2$ | Other Data |
| EKP3 | Pub-Key$_3$ | Priv-Key$_3$ | Expiration Time$_3$ | Key Id$_3$ | Other Data |
| EKP4 | Pub-Key$_4$ | Priv-Key$_4$ | Expiration Time$_4$ | Key Id$_4$ | Other Data |
| EKP5 | Pub-Key$_5$ | Priv-Key$_5$ | Expiration Time$_5$ | Key Id$_5$ | Other Data |
| ⋮ | | | | | |
| EKPN | Pub-Key$_n$ | Priv-Key$_n$ | Expiration Time$_n$ | Key Id$_n$ | Other Data |
| EKPN+1 | Secret-Key$_1$ | Priv-Key$_1$ | Expiration Time$_1$ | Key Id$_1$ | Other Data |
| EKPN+2 | Secret-Key$_2$ | Priv-Key$_2$ | Expiration Time$_2$ | Key Id$_2$ | Other Data |
| EKPN+3 | Secret-Key$_3$ | Priv-Key$_5$ | Expiration Time$_5$ | Key Id$_5$ | Other Data |
| ⋮ | | | | | |
| EKPN+m | Pub-Key$_m$ | Priv-Key$_n$ | Expiration Time$_n$ | Key Id$_n$ | Other Data |

*Figure 1a*

EPHEMERAL DECRYPTION UTILIZING BINDING FUNCTIONS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention pertains to protecting data in computer networks and more particularly, to a method and system for protecting data such that the data is made unrecoverable after a predetermined finite period of time, or when desired.

In recent years, individuals and businesses have increasingly employed computer and telecommunications networks, such as the World Wide Web (WWW), to store and access data remotely and to send and receive messages via e-mail or instant messaging services. Typically when a user remotely accesses data or sends a message or data to another computer, the data or message is sent through one or more intermediate systems within the network where the data is temporarily written to memory or data storage devices associated with those intermediate systems. The memory and data storage devices of the intermediate systems and the communications lines within the network are susceptible to the malicious actions of a third party in which the messages or data may be intercepted or otherwise accessed. To prevent these messages or data from being improperly accessed, various data encryption methods have been developed to prevent a third party from being able to access the clear data or message even if the data or message is intercepted or otherwise accessed. Some encryption methods are also used for integrity checking and/or authentication of a message or data by allowing a user to determine whether the message or data has been altered, while authentication allows a a user to verify the source of a message.

While encryption protects encrypted data from being understood by someone not in possession of the decryption key, the longer such encrypted information is stored, the greater potential there may be for such a key to fall into the wrong hands. For example, key escrows are often maintained which keep records of keys. Such records may be stored for convenience in order to recover encrypted data when a key has been lost, for law enforcement purposes, to permit the police to eavesdrop on conversations regarding criminal activities, or for business management to monitor the contents of employee communications.

In existing systems, there are various events that may result in a message remaining stored beyond its usefulness to a receiving party. First, there is no guarantee that a receiver of an encrypted message will promptly delete it after it has been read. Additionally, electronic mail and other types of messages may automatically be "backed-up" to a secondary storage system, either at the destination system or within one or more of the intermediate systems through which the e-mail has passed. These back-up copies are stored for often indeterminate times, and are outside the control of the message originator. Thus, it is apparent that even under ordinary circumstances, a message may remain in existence well beyond its usefulness, and that, as discussed above, such longevity may result in the privacy of the message being compromised. There is no way to guarantee that all copies of the data are deleted. However, if the data is encrypted, all that is necessary to ensure that the data is unrecoverable is to ensure that the decryption key is destroyed.

Existing systems for secure communications, such as the Secure Sockets Layer (SSL) protocol, provide for authenticated, private, real-time communications. In the SSL protocol, a server system generates a short-term public/private key pair that is certified as authentic using a long-term private key belonging to the server. The client uses the short-term public key to encrypt a symmetric key for use during the session. The server periodically changes its short-term private key, discarding any previous versions. This renders any records of previous sessions established using the former short-term public key unrecoverable. Such a system is sometimes referred to as providing "perfect forward secrecy". These existing systems, however, provide no mechanism for setting or determining a finite "lifetime", in terms of decryptability, for stored encrypted data or messages independent of a real-time communications session.

Ephemeral encryption has been developed to ensure that ephemeral keys, i.e., encryption and decryption key pairs that have a predetermined lifetime, are securely created, maintained, and destroyed by ephemeral agents ("ephemerizers"). Ephemerizers create, manage, and destroy encryption keys in a secure manner that prevents the keys from existing beyond the predetermined lifetime. In general, an ephemerizer is able to provide ephemeral encryption and decryption services to many users so as to amortize the cost of managing the ephemeral key pairs over the many users.

Previous methods of ephemeral encryption require authentication of the client and the ephemerizer, which is computationally intensive. In addition, authentication requires that the ephemerizer see either the clear-text or the message encrypted with the long term key of the user. If another party than the intended user is able to obtain the message encrypted with the long term key of the user, then the other party can store this encrypted message and decrypt it at a later time when the long term key of the user may become available due to theft or coercion.

It would be desirable therefore to have a system in which data has a finite lifetime and in which during the finite lifetime only the authorized user can make use of the ephemerizer to obtain either a clear-text message or a message encrypted with the long term key of the user. The encrypted message should be effectively protected after the ephemeral key is destroyed, assuming the authorized user protected the long term key during the lifetime of the ephemeral key and kept no copies of the message except for copies encrypted with the ephemeral key.

BRIEF SUMMARY OF THE INVENTION

In accordance with the present invention, a method and system for performing blinded ephemeral encryption/decryption is disclosed. The presently disclosed system and method enables a user to encrypt a message in a way that ensures that the message cannot be decrypted after a finite period and in such a way that the encryption/decryption agent does not gain access to the message or to a message encrypted with the long term secret key. The encrypted message that will become unrecoverable is referred to herein as an ephemeral message. The ephemeral message is encrypted using an ephemeral key associated with an ephemeral encryption/decryption agent forming an encrypted ephemeral message. To decrypt the encrypted ephemeral message, the encrypted ephemeral message is blinded by a node and communicated to the ephemerizer. The ephemerizer decrypts the blinded encrypted ephemeral message using the ephemeral decryption key and returns the blinded ephemeral message to the node. The node then unblinds the blinded ephemeral message to obtain the original ephemeral message. The ephemeral message may be encrypted without the cooperation of an ephemeral encryption agent by using a public key of a public/private key pair such as an RSA encryption key (e,n) or a Diffie-Hellman key ($g^x$,p) that is associated with the ephemeral agent. Alternatively, the ephemeral message is encrypted with the cooperation of the ephemeral agent where the ephemeral agent maintains a secret encryption and decryption key. In this instance, the ephemeral message is blinded prior to providing the ephemeral message to the ephemerizer to be encrypted and unblinded upon being returned to the originating node. The above-described blinding process may be performed via any mathematical operations by which pairs of functions that are inverses of one another are used to encrypt/decrypt and to blind/unblind the message and can be performed in any order. In the descriptions that follow, it should be understood that the first node and second node may be the same node and the ephemeral message is encrypted and securely stored and later retrieved by the first node for decryption.

The ephemerizer is able to create ephemeral encryption and decryption keys that can be irretrievably deleted. The ephemeral decryption keys can be irretrievably deleted in response to upon the occurrence of a specified event such as a the occurrence of a predetermined expiration date, in response to a demand by a user to delete the ephemeral key, or any other suitable event. In the case when the ephemeral encryption key is a secret encryption function, the ephemeral encryption keys can be irretrievably deleted as well. The ephemerizer provides these ephemeral encryption keys to a user, manages the secure storage and maintenance of the ephemeral encryption and decryption keys, and manages the destruction of these keys when necessary. The ephemeral encryption and decryption keys may be public/private key pairs or secret symmetric encryption/decryption key pairs. A user is able to select an appropriate ephemeral encryption key based on the expiration date or other data provided such as the cryptographic strength of the key. In addition, a user may request an ephemerizer provide a custom key having particular qualities such as a particular expiration date and/or cryptographic strength.

In one embodiment, a first node that desires to employ blinded decryption of an encrypted ephemeral message that may be communicated to a second node encrypts a clear message with an ephemeral encryption key, forming an encrypted ephemeral message. The ephemeral encryption key is associated with a key ID and is managed by the ephemeral decryption agent. The first node encrypts a clear-text message using an ephemeral public key (e,n) of an RSA public/private pair held by the ephemeral decryption agent, where the ephemeral decryption agent maintains as a secret key the corresponding private RSA key (d,n), and where the public/private key pair has a corresponding key ID. The key ID can be the public key, an expiration date, or other indicia of identification used by the ephemeral decryption agent to uniquely identify the public/private key pair. The first node ephemerally encrypts the message M by raising M to the power e mod n, to get $M^e$ mod n. The encrypted ephemeral message is securely provided to the second node along with the key ID, which does not have to be securely provided. The message can be securely provided by encrypting the ephemerally encrypted message by further encrypting the ephemerally encrypted message with the public key of the second node or with a secret key known only the first and second nodes.

To securely decrypt the encrypted ephemeral message, the second node selects a blinding number R, which can be a randomly generated number, and determines the multiplicative inverse of R as $R^{-1}$ that satisfies $R*R^{-1}=1$ mod n and blinds the encrypted ephemeral message using R by raising R to the power e mod n, $R^e$ mod n, and multiplying this result by the encrypted message M, forming a first blinded encrypted ephemeral message ($R^e*M^e$)mod n. The second node provides the first blinded encrypted ephemeral message and the ephemeral key ID to an ephemeral decryption agent that decrypts the first blinded encrypted ephemeral message by applying the ephemeral RSA private key (d,n) corresponding to the ephemeral key ID of the public/private key pair by raising the first blinded encrypted ephemeral message to the power d mod n, ($R^e$ mod n)$^d$ mod n($M^e$ mod n)$^d$ mod n, forming a second blinded ephemeral message R*M mod n. The second blinded ephemeral message is returned to the second node and the second node operates on the second blinded ephemeral message by multiplying the second blinded message by the multiplicative inverse of R, i.e., $R^{-1}$ mod n, to form the original clear message, M.

In another embodiment, a first node that desires to employ blinded decryption of a message that may be communicated to a second node, encrypts a clear message with an ephemeral encryption key, forming an encrypted ephemeral message. The ephemeral encryption key is a published Diffie-Hellman public key of an ephemeral decryption agent having an ephemeral key ID and is of the form $g^x$ mod p, where g and p are publicly known and x is maintained as a secret by the ephemeral decryption agent. The ephemeral key ID can be the public key, an expiration date, or other indicia of identification used by the ephemeral decryption agent to uniquely identify the public/private key pair. The first node selects a number y, which may be a randomly generated number, and raises the public key of the third party to the power y, resulting in $g^{xy}$ mod p. The first node also computes and saves the value of $g^y$ mod p. The first node uses $g^{xy}$ mod p as an encryption key to encrypt the desired information and keeps the message encrypted with $g^{xy}$ mod p and the value $g^y$ mod p, but discards y and $g^{xy}$. The first node securely communicates the encrypted ephemeral message and the value of $g^y$ mod p to the second node. In addition, the ephemeral key ID is also provided, but does not have to be securely provided. Later to securely recover the encrypted ephemeral message, the second node selects a blinding function z, computes the exponentiative inverse of z as $z^{-1}$, and raises $g^y$ mod p to the power z resulting in $g^{yz}$ mod p. The blinded key $g^{yz}$ mod p and the key ID are provided to the ephemeral decryption agent that raises the blinded function $g^{yz}$ mod p to the power x resulting in $g^{xyz}$ mod p. The function $g^{xyz}$ mod p is provided to the second node and $g^{xyz}$ mod p is raised to the power $z^{-1}$ mod p by the second node to obtain $g^{xy}$ mod p. The decryption is accomplished by the second node using $g^{xy}$ mod p since this was the encryption key used by the first node to encrypt the data.

In another embodiment, a first node that desires to employ blinded decryption of a message that may be communicated to a second node, encrypts a clear message with an ephemeral encryption key, forming an encrypted ephemeral message. In this embodiment, the first node requires the cooperation of an ephemeral encryption/decryption agent to encrypt the clear message. The ephemeral encryption/decryption agent maintains a secret encryption key, x, and a secret decryption key that is the exponentiative inverse of x. To encrypt the clear message, the first node selects a number R, which may be randomly generated, and computes the exponentiative inverse $R^{-1}$ that satisfies $R*R^{-1}=1$ mod p-1 and selects an ephemeral key having an ephemeral key ID. To blind the clear message M, the first node raises the clear message M to the number R to obtain $M^R$ mod p. The first node provides the blinded ephemeral message $M^R$ mod p and the ephemeral key ID to the ephemeral encryption/decryption agent that encrypts the blinded ephemeral message with the encryption key x by raising the blinded message to the power x mod p, $M^{Rx}$ mod p and returns the blinded encrypted ephemeral message to the first node. The first node unblinds the encrypted ephemeral message by raising $M^{Rx}$ mod p to the previously calculated exponentiative inverse $R^{-1}$ mod p to obtain the encrypted ephemeral message $M^x$ mod p. The first node securely communicates the encrypted ephemeral message and the ephemeral key ID to the second node. To decrypt the encrypted ephemeral message, the second node selects a blinding number j, which may be randomly generated, and computes the exponentiative inverse of j as $j^{-1}$. The node raises the encrypted ephemeral message $M^x$ mod p to the power j mod p to obtain $M^{xj}$ mod p. The blinded encrypted ephemeral message $M^{xj}$ mod p and the ephemeral key ID are provided to the ephemeral encryption/decryption agent, where the ephemeral encryption/decryption agent decrypts the blinded encrypted ephemeral message using the decryption key that is the previously calculated exponentiative inverse $x^{-1}$ mod p and corresponds to the ephemeral key ID. The ephemeral encryption/decryption agent raises the blinded encrypted ephemeral message $M^{xj}$ mod p to the power $x^{-1}$ mod p to obtain the blinded ephemeral message $M^j$ mod p. The blinded ephemeral message is returned to the second node and unblinded using the previously calculated exponentiative inverse, mod p, of j, $j^{-1}$ mod p, by raising the blinded message to the power $j^{-1}$ mod p to obtain the clear message M.

In the embodiments described above, to securely transmit the message to Node B, Node A may encrypt the encrypted ephemeral message with the public key of Node B and transmit the doubly encrypted message to Node B. Alternatively, Node A may encrypt the encrypted message using a secret key known only to Node A and Node B. In another alternative, Node A provides the message to Node B such that only Node B receives the message, e.g., by hand delivering the encrypted message to Node B. Alternatively, Node A 12 may also securely store the ephemerally encrypted message, for example by encrypting the data a second time using Node A's public key or a secret key known only to Node A, wherein the secret key is not stored together with the encrypted message.

Other features, aspects and advantages of the above-described method and system will be apparent from the detailed description of the invention that follows.

BRIEF DESCRIPTION OF THE SEVERAL VIEWS OF THE DRAWING

The invention will be more fully understood by reference to the following detailed description of the invention in conjunction with the drawing of which:

FIG. 1a shows an ephemeral key pair list;

DETAILED DESCRIPTION OF THE INVENTION

Figure 1B:
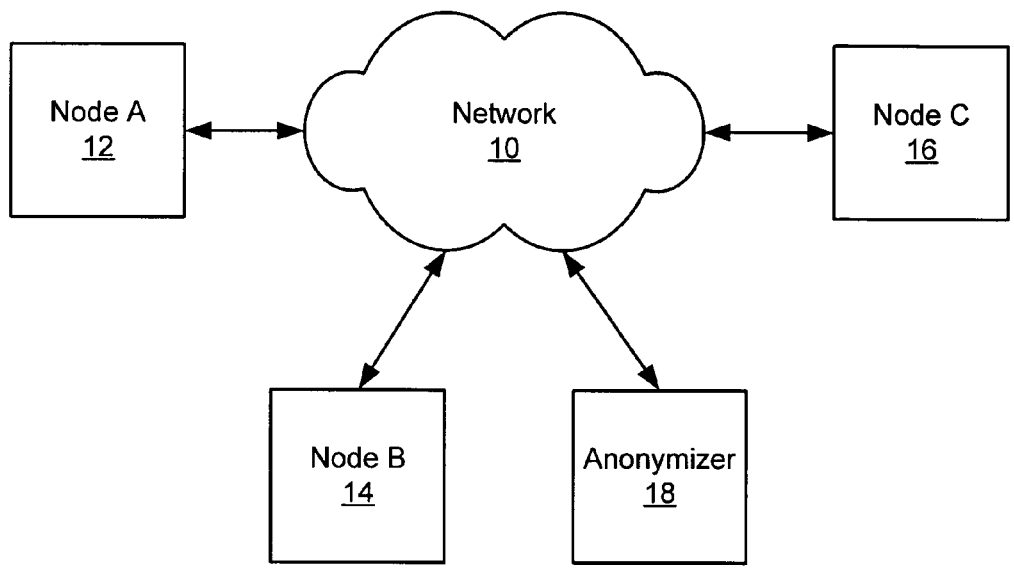
FIG. 1b is a block diagram depicting a system operative in a manner consistent with the present invention.

A system and method in accordance with the present invention for performing ephemeral encryption and decryption so as to preclude access to the information being encrypted and/or decrypted and to preclude access to unauthorized users of the information encrypted with long term encryption key of the user by the ephemeral encryption/decryption agent is disclosed.

It is well-known how to compute exponentiative inverses mod a prime p. As used herein, exponentiative inverses are numbers x and $x^{-1}$ such that any number $(K^x)^{x^{-1}}$ mod p=K. The exponentiative inverse, mod p, of x is computed as the multiplicative inverse of x mod p-1, where p is a prime number. We use $\{M\}K$ to denote a message M encrypted with a key K. When we use the term "p" in mod p arithmetic, p is a prime.

As shown in FIG. 1a, an ephemeral key pair list 10 includes a number of ephemeral key pairs 12. Each ephemeral key pair can include a public key 14 and a corresponding private key 16, or a secret encryption key 14 and a corresponding secret decryption key 16. An expiration time 18, a Key ID 20, and other data 22, such as the cryptographic strength of the key are associated with each ephemeral key pair. The public key 14 of an ephemeral key pair, the associated expiration time 18, the Key Id 20, and other information such as the key strength may be read and used by parties wishing to use an ephemeral public key pair 12. For security reasons, the secret encryption keys are maintained in secret, however, a party wishing to select a secret encryption key may select the key based on the expiration date and other data such as the cryptographic strength of the key. Encryption using a secret encryption key will be explained in more detail below. Thus, the secret encryption key 14 and the secret decryption key and private key 16 of each ephemeral key is accessible only to the ephemerizer. If each ephemeral key pair has a unique expiration date, the expiration date may also be used as the key ID.

As in conventional encryption techniques, data encrypted using one of the secret encryption keys 14 can only be decrypted using the corresponding secret decryption key 16 from the same ephemeral key pair. Similarly, as in conventional public encryption techniques, data encrypted using one of the public keys 14 can only be decrypted using the private key 16 from the same ephemeral key pair. Each of the ephemeral key pairs 12 represents a promise by the publisher of the ephemeral key pair list 12 to irretrievably destroy the ephemeral key pair.

In addition to the established and published public and secret ephemeral keys, a user may request an ephemerizer create an ephemeral key having specific characteristics. For example, a user may require a specific expiration date and/or a key having a specified minimal cryptographic strength. In these cases, the ephemerizer creates a new key for the user based on the user specifications and promises to destroy the ephemeral key pair at the associated expiration time.

Ideally, the ephemerizer keys, whether secret or private, can be generated and stored on tamper-proof smart cards that prevent copies of the encryption and/or decryption keys to be made. The complete physical wiping and deletion of the smart card memory or the physical destruction of the smart card and associated memory ensures that the key is irretrievably deleted and that no other copies of the ephemeral key exists.

In general, in the instance of using an ephemeral public/private ephemeral key to encrypt an ephemeral message, only the private ephemeral key, i.e., the key necessary to decrypt the encrypted ephemeral message, can be irretrievably deleted in response to a predetermined event such as upon the arrival of a predetermined expiration date and time, in response to a demand by a user to delete the ephemeral decryption key, or any other suitable event. In the event that an ephemeral Diffie-Hellman key is used to encrypt an ephemeral message only the secret x of the $g^x$ mod p key is needed to be irretrievably deleted. As above, the value x can be irretrievably deleted in response to a predetermined event such as the arrival of a predetermined expiration date and time, in response to a demand by a user to delete the ephemeral decryption key, or any other suitable event. In the event that secret ephemeral encryption/decryption keys are used to encrypt and decrypt an ephemeral message, both the secret encryption and decryption keys must be irretrievably deleted. As above, the secret ephemeral encryption/decryption keys can be irretrievably deleted in response to a predetermined event such as the arrival of a predetermined expiration date and time, in response to a request by a user to delete the ephemeral decryption key, or any other suitable event.

Referring to FIG. 1b, the system includes a first node, Node A 12, a second node, Node B 14, a third node, Node C 16, and optionally, an Anonymizer node 18. Node A 12, Node B 14, Node C 16, and the Anonymizer Node 18 are communicably coupled via a Network 10, such as a wide area network, a local area network, or a global communications network such as the Internet. Either Node A 12 or Node B 14 are operative to generate a message or to obtain a message that is to be encrypted such that a third party is required to decrypt the message. In the present context, the term "message" is used generally to refer to any information that is desired to be encrypted and later decrypted and may be securely stored at Node A 12 or securely communicated from Node A 12 to Node B 14. Node C 16 comprises an ephemeral decryption agent 16 ("ephemerizer") that is employed in the retrieval of the encrypted message from Node A 12 or Node B 14 and in some embodiments the ephemerizer may be involved in the encryption of the message as well. The function of the Anonymizer 18 is subsequently discussed.

As described herein, the present system provides a mechanism by which a message may be stored for Node A 12 or communicated to Node B 14 while requiring the involvement of the ephemerizer in the decryption process and in some embodiments in the encryption process as well. The present system prevents the ephemerizer 16 from obtaining access to the information contained within the encrypted message and to information encrypted with the long term encryption key of the user.

As discussed in more detail below, the techniques of blind encryption and/or blind decryption render the need to authenticate the two parties moot. The ephemerizer does not need to know on whose behalf it is performing the ephemeral encryption or decryption. As known in the art, an Anonymizer node substitutes its address as the source address in place of the source address of the originating node. In this manner, the destination node, i.e. Node C 16, obtains no information regarding the identity of the party (Node A 12) requesting assistance in the decryption process. Accordingly, since the identity of the parties is not a requirement, an extra level of security may be obtained in the embodiments that follow through the use of an Anonymizer node to hide the actual identities.

In addition, the secret decryption keys, and secret encryption keys when used, which are maintained by the ephemerizer 16, comprise ephemeral keys that become inaccessible after a predetermined time, upon the occurrence of some predetermined condition, or upon demand. In the event that ephemeral keys are employed by the ephemerizer, the message M will only be accessible to Node A 12 or Node B 14 if presented to the ephemerizer 16 within the time frame in which the respective ephemeral key maintained at the ephemerizer 16 is valid.

Figure 2:
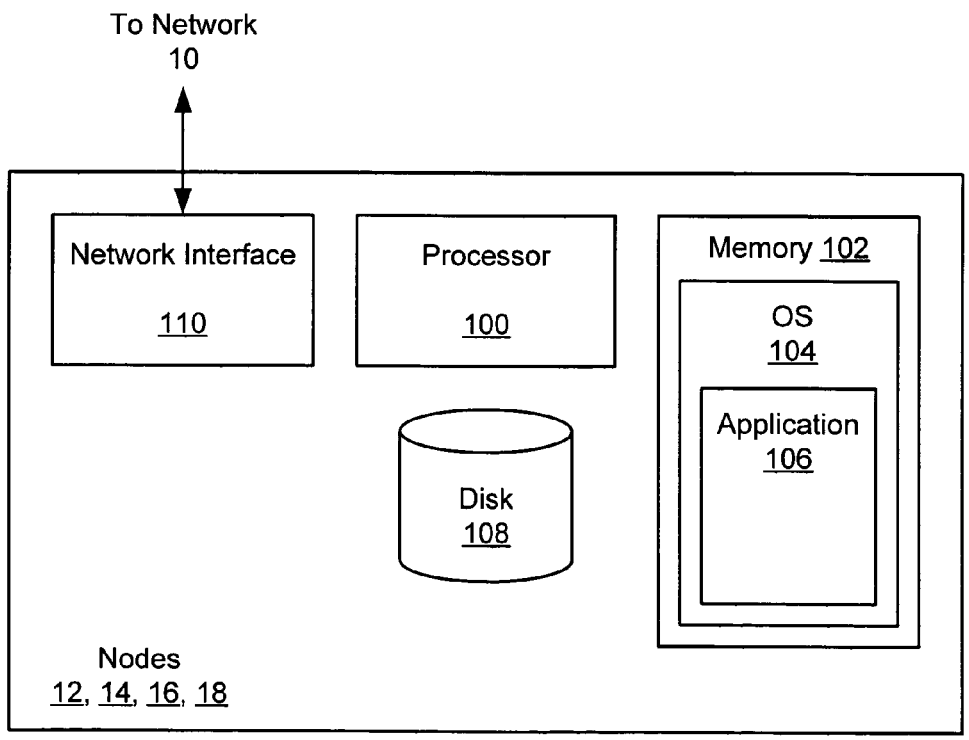
FIG. 2 is a block diagram depicting typical nodes within the system illustrated in FIG. 1.

As illustrated in FIG. 2, Nodes A 12, B 14, the ephemerizer 16, and the Anonymizer node 18 typically include a processor 100 that is operative to execute programmed instructions out of an instruction memory 102. The instructions executed in performing the functions herein described may comprise instructions stored within program code considered part of an operating system 104, instructions stored within program code considered part of an application 106, or instructions stored within program code allocated between the operating system 104 and the application 106. The memory 102 may comprise Random Access Memory (RAM), or a combination of RAM and Read Only Memory (ROM). Nodes A 12, B 14, the ephemerizer 16 and the Anonymizer node 18 each typically include a network interface 110 for coupling the respective node to the network 10. Nodes A 12, B 14, the ephemerizer 16 and the Anonymizer node 18 may optionally include a secondary storage device 108 such as a disk drive, a tape drive or any other suitable secondary storage device.

Figure 3:
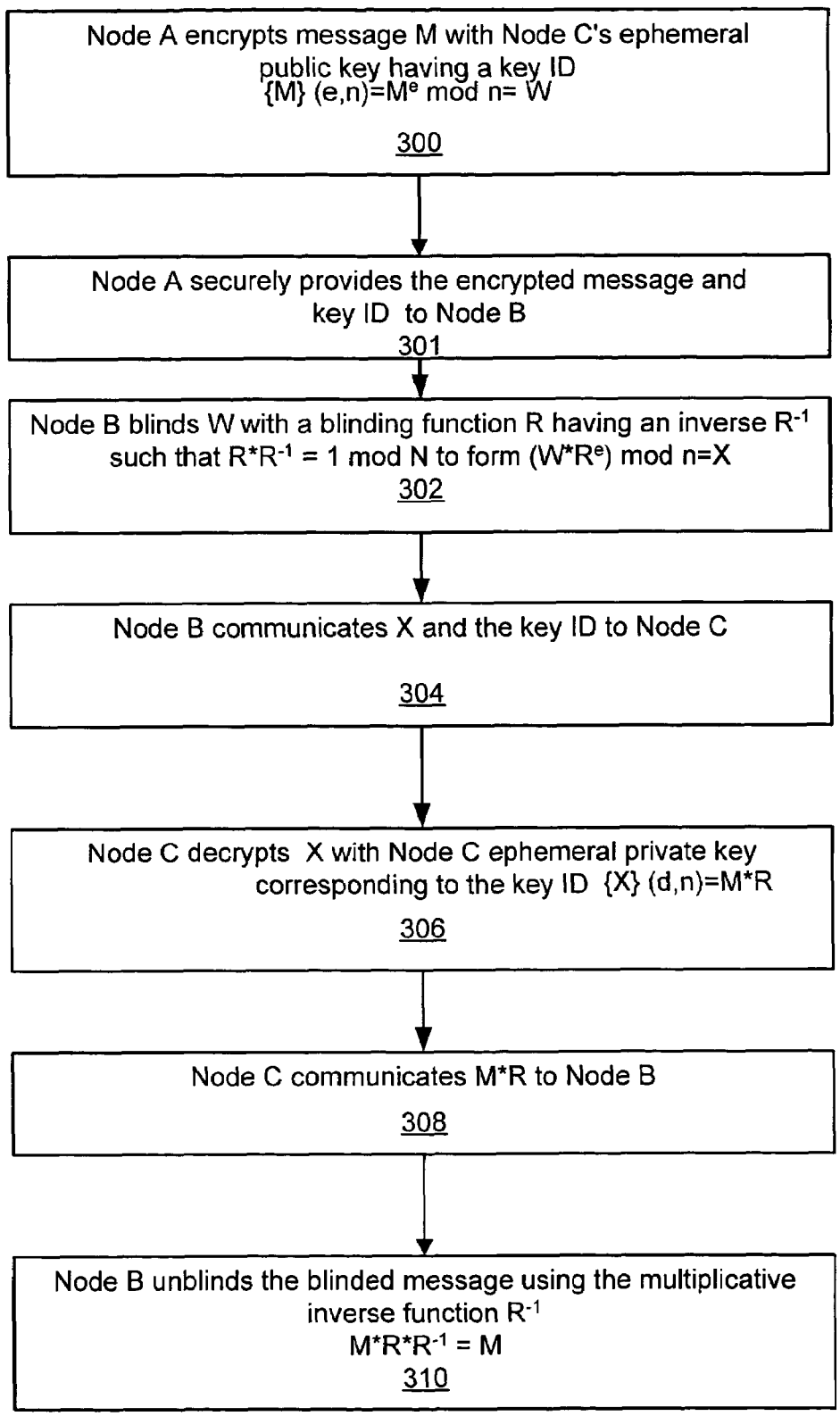
FIG. 3 is a flow diagram depicting a method for performing blinded decryption in the system depicted in FIG. 1.

A method for performing blind ephemeral decryption of a message generated at Node A 12 and ephemerally encrypted in a manner consistent with the present invention is depicted in the flow diagram of FIG. 3. Referring to FIG. 3, Node A 12 generates or obtains a clear message M. Node A 12 selects an ephemeral RSA public key (e,n) published by the ephemerizer that includes a corresponding unique key ID. Node A 12 selects the particular ephemeral key based on the key expiration date or other provided data such as the cryptographic strength of the key. As discussed above, Node A 12 may also request a custom ephemeral key from the ephemerizer if none of the published keys meet its criteria. Node A 12 then encrypts M with the selected ephemeral RSA public key of the ephemerizer 16 as depicted in step 300 to obtain an ephemerally encrypted message $W=M^e$ mod n. Ephemeral encryption in this embodiment is performed without the cooperation of an encryption agent since encryption is performed using one of the published public keys (e,n) of the ephemerizer.

After node A 12 encrypts M with the selected one of the published RSA keys of the ephemerizer, Node A 12 securely transmits the ephemerally encrypted message along with the Key ID, which does not have to be securely transmitted, corresponding to the selected ephemeral key to Node B, as depicted in step 301. To securely transmit the message to Node B, Node A may encrypt the encrypted ephemeral message with the public key of Node B and transmit the doubly encrypted message to Node B. Alternatively, Node A may encrypt the encrypted message using a secret key known only to Node A and Node B. In another alternative, Node A provides the message to Node B such that only Node B receives the message, e.g., by hand delivering the encrypted message to Node B. Alternatively, Node A 12 may also securely store the ephemerally encrypted message, for example by encrypting the data a second time using Node A's public key or a secret key known only to Node A, wherein the secret key is not stored together with the encrypted message. In addition, Node A stores the key ID corresponding to the selected ephemeral public key of the ephemerizer. In the description that follows, Node A retrieves the securely stored message and decrypts the stored data performing the steps described below in place of Node B.

To decrypt the securely transmitted ephemerally encrypted message W, Node B 14 first decrypts the encrypted ephemeral message, if appropriate, using Node B's private key or the secret key that Node B shares with Node A to obtain the ephemerally encrypted message. To decrypt the ephemerally encrypted message W. Node B blinds W with a number R having a multiplicative inverse $R^{-1}$ that satisfies $R*R^{-1}=1$ mod n. Using the published ephemeral RSA public key (e,n) of the ephemerizer corresponding to the key ID provided by Node A 12, Node B 14 raises R to the power e mod n forming $R^e$ mod n and multiplies this result with the encrypted value W, as shown in step 302 to obtain a blinded value $X=(R^e*M^e)$ mod n. As shown in step 304, Node B 14 communicates the blinded value X and the key ID received from Node A 12 to the ephemerizer 16 via the Network 10. Following receipt of the value X, the ephemerizer 16 decrypts X with the ephemeral RSA private key (d,n) of the ephemerizer, corresponding to the key ID provided by Node B 14, by raising X to the power d mod n, leaving a blinded message M*R, as depicted in step 306.

The ephemerizer 16 forwards the blinded message M*R to Node B 14 as depicted in step 308. Node B 14 unblinds M*R by multiplying by the multiplicative inverse of R, $R^{-1}$ mod n to obtain the original message M as illustrated in step 310.

The blinding number R and its multiplicative inverse $R^{-1}$ mod n must be suitable for use with the RSA public/private keys described above such that the blinding number is interleaved with the encrypted message and does not change the message when the decryption and unblinding functions are applied to the blinded encrypted message. Accordingly, R must be of a suitable length and may be randomly generated.

Figure 4A:
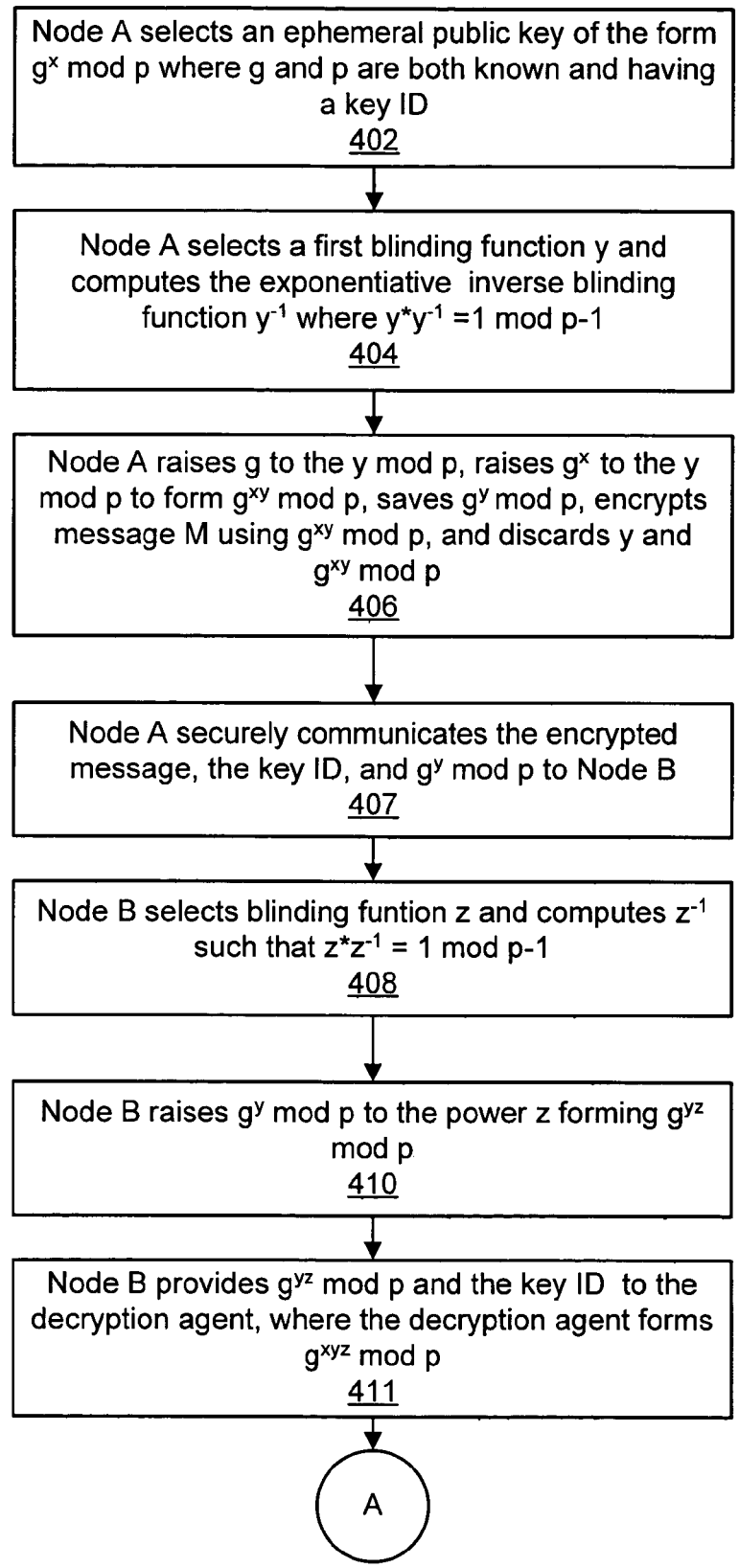
FIGS. 4a and 4b are a flow diagram depicting a method for performing blinded encryption and decryption in the system depicted in FIG. 1.
Figure 4B:
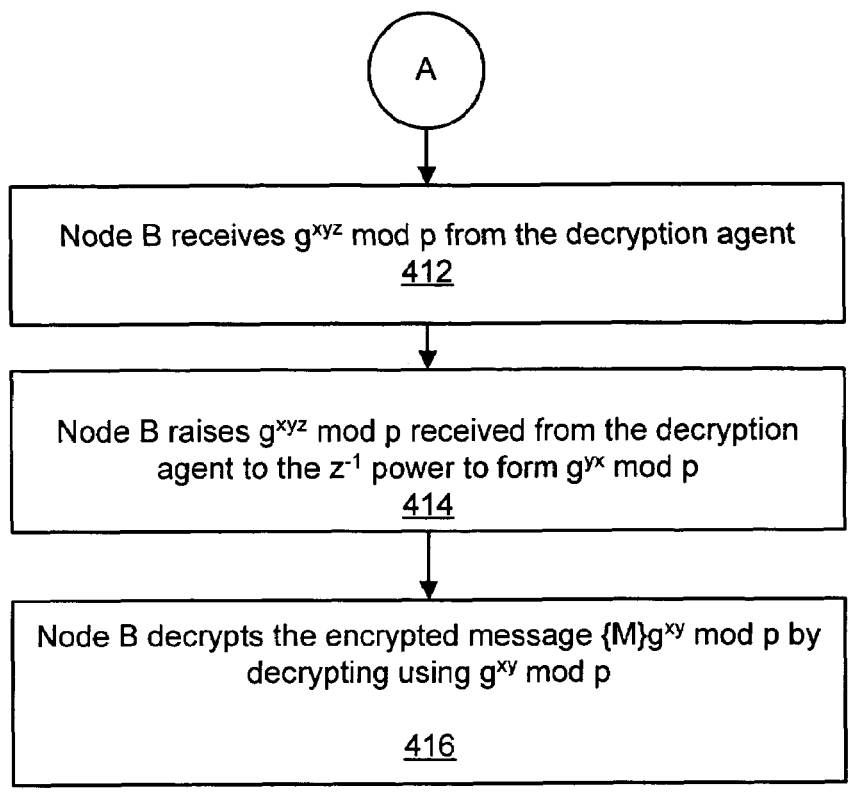

Another method for performing the blind decryption of a message using an ephemeral Diffie-Hellman public key published by ephemerizer 16 of the form $g^x$ mod p is depicted in the flow diagram of FIGS. 4a and 4b (collectively referred to as FIG. 4). Referring to FIG. 4, Node A 12 generates or obtains a clear message M. An ephemerizer 16, publishes one or more ephemeral public Diffie-Hellman encryption keys, each key corresponding to a unique key ID. The published ephemeral keys are in the form $g^x$ mod p, where the base, g, and the modulus, p, are both publicly available. The ephemerizer maintains x as a secret key, as depicted in step 402. To encrypt the clear message M, Node A selects a first number y, which may be randomly generated, and selects one of the published ephemeral keys ($g^x$ mod p). Node A 12 raises the selected ephemeral public key to the power y mod p to form a second number, $g^{xy}$ mod p, as depicted in step 404. Node A then encrypts the clear message M with the key $g^{xy}$ mod p to form an encrypted message, $\{M\}g^{xy}$ mod p. In addition, Node A 12 raises the base g to the power y mod p. Node A then saves the encrypted message $\{M\}g^{xy}$ mod p, the key ID and/or key expiration date corresponding to the selected ephemeral key, and the value $g^y$ mod p and discards y and $g^{xy}$ mod p, as depicted in step 406. If the message is intended to be received by a second node, Node A then securely transmits the encrypted message $\{M\}g^{xy}$ mod p, and further transmits, securely or not, the key ID and/or key expiration date, and $g^y$ mod p to Node B 14 as depicted in step 407. To securely transmit the message to Node B, Node A may encrypt the encrypted message with the public key of Node B and transmit the doubly encrypted message to Node B. Alternatively, Node A may encrypt the encrypted message using a secret key known only to Node A and Node B. In another alternative, Node 12A securely provides the message to Node B 14 such that only Node B receives the message, e.g., by hand delivering the encrypted message to Node B. For decryption purposes, Node B first decrypts the received message if appropriate using Node B's private key or the secret key if used to securely send the message to Node B. To decrypt the ephemerally encrypted message W, Node B selects a blinding number z, and computes the exponentiative inverse $z^{-1}$, as depicted in step 408. Node B raises the value $g^y$ to the power z mod p to blind $g^y$ mod p to form $g^{yz}$ mod p, as depicted in step 410. Node B provides $g^{yz}$ mod p and the key ID to the decryption agent. The decryption agent then raises the value of $g^{zy}$ mod p to the power x mod p, with the x corresponding to the key ID, to form $g^{xyz}$ mod p, as depicted in step 411. The decryption agent then provides $g^{xyz}$ mod p to Node B as depicted in step 412. Node B raises the value $g^{xyz}$ mod p to the power of the exponentiative inverse function $z^{-1}$ to form $g^{xy}$ mod p as depicted in step 414. Node B then uses the value $g^{xy}$ to decrypt the encrypted message, as depicted in step 416.

In the above-described embodiment the first number and blinding number, y and z, respectively, can be independently selected integer random numbers and are kept secret. The size of the integer random numbers should be sufficiently large to withstand a cryptoanlytical attack by the decryption agent or some other party.

Figure 5A:
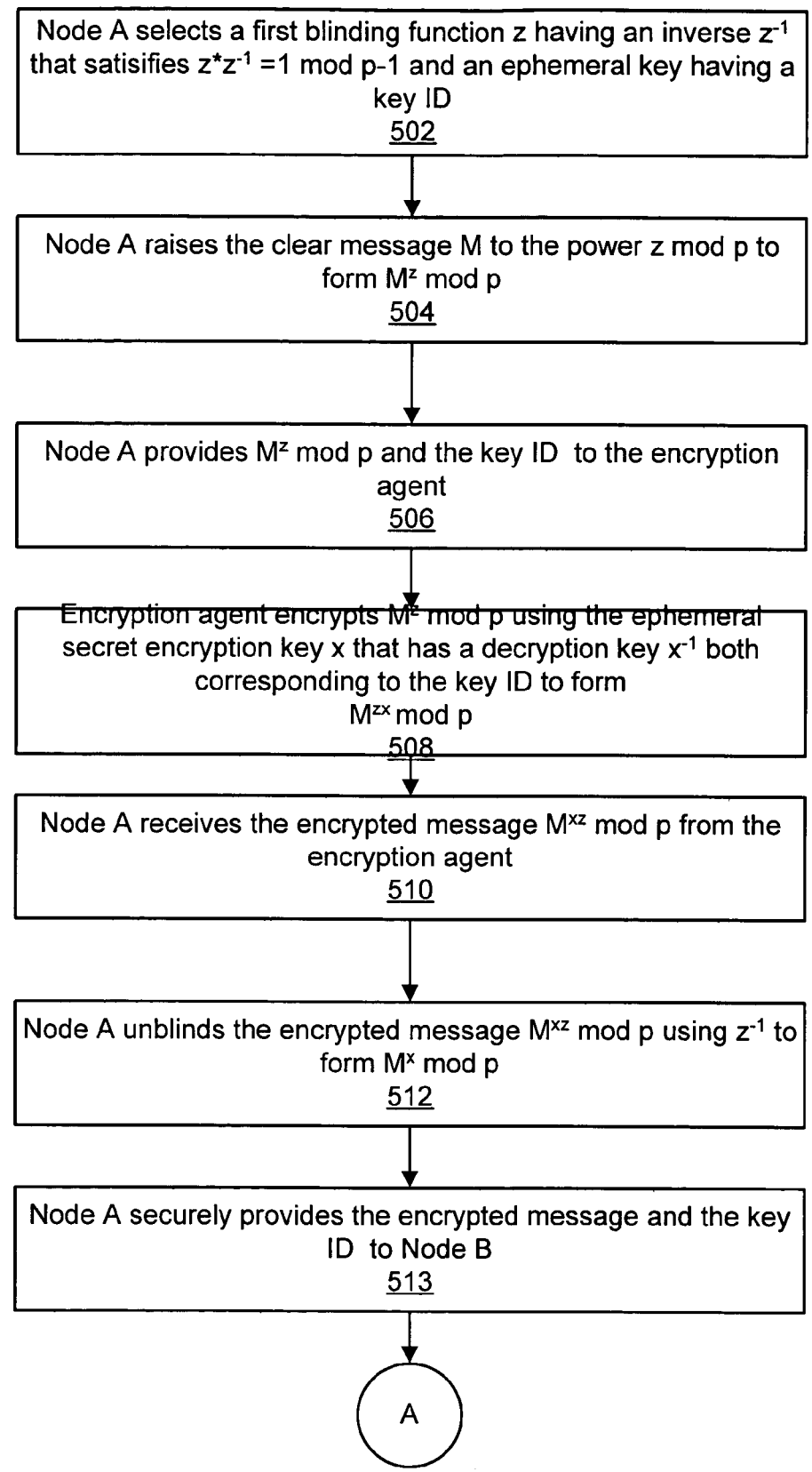
FIGS. 5a and 5b are a flow diagram depicting a method for performing blinded decryption in the system depicted in FIG. 1.
Figure 5B:
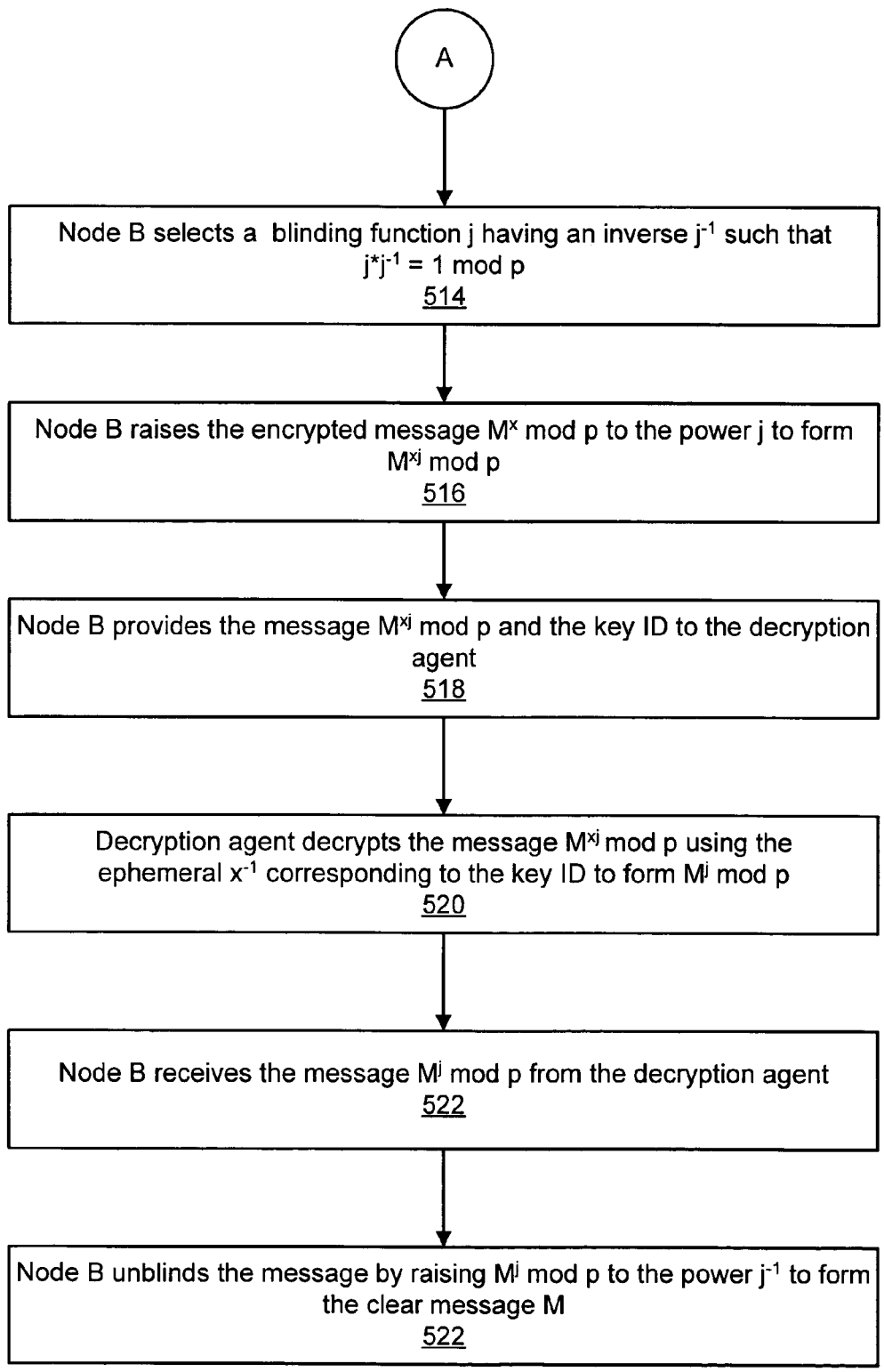

Another method for performing the blind ephemeral encryption and decryption of a message by Node A 12 is depicted in the flow diagram of FIGS. 5a and 5b (collectively referred to as FIG. 5). In this embodiment, the ephemerizer computes secret ephemeral encrypting functions and secret ephemeral decrypting functions that are inverses of one another to ephemerally encrypt and decrypt the message respectively. Typically, the encryption/decryption functions are a number x and the exponentiative inverse $x^{-1}$ and correspond to a unique key ID. To encrypt the message M, M is raised to the power x mod p forming $M^x$ mod p and to decrypt the message, the encrypted message $M^x$ mod p is raised to the power $x^{-1}$ mod p leaving M.

Referring to FIG. 5, Node A 12 generates or obtains a clear message M to be securely communicated to Node B 14. Node A selects a suitable ephemeral key, corresponding to a key ID and/or key expiration date. The selection of the ephemeral key may be based on the key expiration date and/or other cryptographic criteria. Node A 12 then selects a first blinding number z and computes a first inverse blinding function $z^{-1}$ that is the exponentiative inverse $z^{-1}$, as depicted in step 502. Node A raises the clear message M to the power z mod p, forming a blinded message $M^z$ mod p, as depicted in step 504. Node A provides the blinded message and key ID corresponding to the selected ephemeral key to the ephemerizer, as depicted in step 506. The ephemerizer encrypts the blinded message, by raising the blinded message $M^z$ mod p to the power x mod p, forming a blinded encrypted message $M^{xz}$ mod p, as depicted in step 508. The ephemerizer returns the blinded encrypted message $M^{xz}$ mod p to Node A, as depicted in step 510. Node A unblinds the blinded encrypted message, $M^{xz}$ mod p, by raising it to the power $z^{-1}$ forming an encrypted message $M^x$ mod p, as depicted in step 512.

As depicted in step 513 Node A securely transmits the encrypted message $M^x$ mod p and the key ID corresponding to the selected ephemeral key to Node B. To securely transmit the message to Node B, Node A may encrypt the encrypted message with the public key of Node B and transmit the doubly encrypted message to Node B. Alternatively, Node A may encrypt the encrypted message using a secret key known only to Node A and Node B. In another alternative, Node A provides the message to Node B such that only Node B receives the message, e.g., by hand delivering the encrypted message to Node B. To decrypt the message, as depicted in step 514, Node B decrypts the message W using its own private key or the secret key if appropriate. To decrypt the ephemerally encrypted message W, Node B selects a second blinding number j and computes a second inverse blinding number $j^{-1}$ that is the exponentiative inverse of j. Node B raises the encrypted message to the power of the blinding number j mod p, forming $M^{jx}$ mod p which is the blinded encrypted message, as depicted in step 516. Node B provides the blinded encrypted message $M^{jx}$ mod p and the key ID and/or key expiration date received from Node A to the ephemerizer, as depicted in step 518. The ephemeral decryption agent decrypts the blinded encrypted message by raising the blinded encrypted message to the power of the decryption value, $x^{-1}$ mod p corresponding to the key ID, to form a blinded message, $M^j$ mod p, as depicted in step 520. The decryption agent provides the blinded message, $M^j$ mod p to Node B, as depicted in step 522. Node B unblinds the blinded message, $M^j$, by raising the blinded message to the power of the second inverse blinding number, $j^{-1}$, forming the clear message M, as depicted in step 524.

In the above-described method, the first, second, and third blinding functions, z, j, and k can be independently selected integer random numbers and are kept secret. The size of the integer random numbers should be sufficiently large to provide blinding protection that is sufficient to thwart the blinding of the message by the encryption or decryption agents or some other party that may be interested in the clear message M. In the embodiment in which z, j, and k are integer random numbers, the first, second, and third blinding functions are then computed as the exponentiative inverses.

The above-described techniques for performing blinded ephemeral encryption and ephemeral decryption are illustrated above using public/private key pairs. For an ephemeral decryption agent that provides a public ephemeral encryption key E, maintains a secret private ephemeral decryption key D, and in which the node selects a blinding function B and an inverse blinding function U, any combination of functions E, B, D, and U that work as E, B, D, U to provide the clear message M can be used. In the embodiment in which an ephemeral encryption/decryption agent that maintains a pair of secret ephemeral encryption/decryption functions E and D and in which the node selects a first blinding function B and a first inverse blinding function U and a second blinding function B' and a second blinding function U', any combination of functions E, B, D, and U that work as B, E, U, B', D, U' to provide the clear message M can be used. In addition, although the ephemerizer can be separate nodes performing the corresponding encryption and decryption functions respectively, a single node ephemerizer can perform both the encryption and decryption functions as well. In addition, the encryption/decryption steps and the blinding/unblinding steps can be performed in any order.

The above description of blinded ephemeral decryption and blinded ephemeral encryption/decryption is directed toward communication between two or more nodes. However, as discussed above, a single node can securely store data using an ephemeral encryption key, whether public or secret, and can use the above techniques to recover this information. To securely store the information, the single node can encrypt the ephemerally encrypted message with a public key or secret key used by the single node or can provide adequate physical security. In this single node embodiment, a single node forms the message M and ephemerally encrypts M as W and stores the decryption key in a secure manner. There is no need to securely communicate the ephemerally encrypted message from a first node to a second node since only a single node is used. The single node recovers the securely stored message and proceeds to blind and decrypt the message as described above where the single node operates in place of Node B 14.

Those skilled in the art should readily appreciate that programs defining the functions of the disclosed cryptographic system and method for providing blinded ephemeral encryption and ephemeral decryption can be implemented in software and delivered to a computer system for execution in many forms; including, but not limited to: (a) information permanently stored on non-writable storage media (e.g. read only memory devices within a computer such as ROM or CD-ROM disks readable by a computer I/O attachment); (b) information stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the illustrative embodiments may be implemented in computer software, the functions within the illustrative embodiments may alternatively be embodied in part or in whole using hardware components such as Application Specific Integrated Circuits, Field Programmable Gate Arrays, or other hardware, or in some combination of hardware components and software components.

It should be appreciated that other variations to and modifications of the above-described method and system for performing blinded encryption and/or decryption may be made without departing from the inventive concepts described herein. Accordingly, the invention should not be viewed as limited except by the scope and spirit of the appended claims.

What is claimed is:

1. A method for performing blinded ephemeral decryption of a message, the method comprising the steps of:

receiving from a first node at an ephemerizer an ephemeral key ID and a message blinded and encrypted with an ephemeral encryption key of an ephemeral key pair to form a blinded and encrypted message, said ephemeral key pair associated with said ephemeral key ID, wherein said blinded and encrypted message was blinded by a blinding function z, wherein z is a number R having an inverse R.sup.−1 that satisfies R*R.sup.−1=1 mod n;

decrypting said blinded and encrypted message using an ephemeral decryption key of said ephemeral key pair to form a blinded message, wherein said ephemeral key pair is an ephemeral public key pair including ephemeral public and private keys, and wherein said ephemeral public and private keys comprise an ephemeral RSA public/private key pair of the form (e,n) and (d,n) respectively;

communicating said blinded message to said first node; and irretrievably deleting said ephemeral decryption key in response to a specified event;

wherein the blinded and encrypted message is formed as the product (R.sup.e*M.sup.e mod n) where (M.sup.e mod n) is said message M encrypted using said ephemeral public encryption key.

2. The method of claim 1 wherein said ephemeral key ID is associated with an ephemeral RSA public and private key pair corresponding to said ephemeral encryption key and said ephemeral decryption key, respectively.

3. The method of claim 1 wherein said ephemeral key ID is associated with an ephemeral Diffie-Hellman key pair having a public key and a private key corresponding to said ephemeral encryption key and said ephemeral decryption key, respectively.

4. The method of claim 1 wherein said ephemeral key ID is associated with a secret ephemeral encryption key and a secret ephemeral decryption key and wherein said secret ephemeral encryption key and said secret ephemeral decryption key are symmetric keys.

5. The method of claim 1 further including prior to the receiving step, the step of generating said ephemeral key ID and said ephemeral encryption and decryption keys of said ephemeral key pair.

6. The method of claim 5 further including the steps of:
receiving a request for an ephemeral encryption key from said first node; and
providing said ephemeral key ID and said ephemeral encryption key of said ephemeral key pair to said first node.

7. The method of claim 6 further including the steps of:
encrypting a message by said first node using said ephemeral encryption key to form an encrypted message;
securely transmitting said encrypted message to a second node.

8. The method of claim 6 further including the steps of:
encrypting said message by said first node using said ephemeral encryption key to form an encrypted message; and
securely storing said encrypted message by a second node.

9. The method of claim 8 further including the step of:
retrieving said securely stored encrypted message by said second node.

10. The method of claim 8 wherein the second node and the first node are the same node.

11. The method of claim 5 wherein said ephemeral encryption key and said ephemeral decryption key of said ephemeral key pair are an ephemeral RSA public key and corresponding private key, respectively.

12. The method of claim 5 wherein the ephemeral encryption key and said ephemeral decryption key of said ephemeral key pair are Diffie-Hellman public and private keys, respectively.

13. The method of claim 5 wherein said ephemeral encryption key and said ephemeral decryption key of said ephemeral key pair are secret symmetric encryption and decryption keys.

14. The method of claim 5 further including the step of storing said generated ephemeral decryption key on a smart card.

15. The method of claim 14 further including the step of irretrievably deleting said ephemeral key stored on said smart card in response to a specified event.

16. The method of claim 15 further including the step of physically destroying said smart card in response to a specified event.

17. The method of claim 1 wherein said specified event is the recognition of a predetermined date and time.

18. The method of claim 1 wherein said specified event is in response to a request by a user to delete said ephemeral decryption key.

19. A method for performing blind ephemeral decryption of a message M that has been encrypted to form an encrypted message, comprising the steps of:
in a first blinding step, blinding said encrypted message at a first node with a blinding function z to form a first blinded and encrypted message, wherein z has an inverse $z^{-1}$, and wherein z is a number R having an inverse $R^{-1}$ that satisfies $R*R^{-1}=1 \mod n$;
in a first communicating step, communicating said first blinded and encrypted message from said first node to a decryption agent;
decrypting said first blinded and encrypted message by said decryption agent using an ephemeral decryption function to form a first blinded message, wherein said ephemeral decryption function is the inverse of said ephemeral encryption function, and wherein said ephemeral encryption and decryption functions are respectively, ephemeral public and private keys of an ephemeral public key pair, and wherein said ephemeral public and private keys comprise an ephemeral RSA public/private key pair of the form (e,n) and (d,n) respectively;
in a second communicating step, communicating said first blinded message from said decryption agent to said first node; and
in a first unblinding step, unblinding said first blinded message using $z^{-1}$, to obtain said message M; and
irretrievably deleting said ephemeral decryption key in response to a specified event;
wherein said first blinding step includes the step of forming the first blinded and encrypted message as the product ($R^e*M^e \mod n$) where ($M^e \mod n$) is said message M encrypted using said ephemeral public encryption key.

20. The method of claim 19 wherein said first node and said decryption agent are communicably coupled via a network, and at least one of said first and second communicating steps comprises the step of communicating the respective message over said network.

21. The method of claim 20 wherein said first and second communicating steps comprise communicating the respective messages over said network.

22. The method of claim 19 wherein said first communicating step comprises the step of communicating said first blinded and encrypted message from said first node to said decryption agent via an anonymizer node and said second communicating step comprises the step of communicating said first blinded message from said decryption agent to said first node via said anonymizer node.

23. The method of claim 19 further including the step of rendering said ephemeral decryption function irretrievably deleted upon the occurrence of said specified event.

24. The method of claim 19 further including the step of generating said message at said first node.

25. The method of claim 19 wherein the decryption step includes the step of raising the product (($R^e*M^e$) $\mod n$) to the power d mod n, forming (($R^e*M^e$) $\mod n$)$^d \mod n$ to form said first blinded message $R*M \mod n$.

26. The method of claim 25 wherein the first unblinding step includes the step of unblinding said first blinded message $R*M \mod n$ using $R^{-1}$ to obtain said message M.

27. The method of claim 19 further including the step of generating an integer random number and utilizing said random number as the blinding number R.

28. The method of claim 19 further comprising the steps of:
obtaining an ephemeral public key associated with said decryption agent, wherein said ephemeral public key is a Diffie-Hellman public key of the form $g^x \mod p$;
selecting a blinding number y having an inverse blinding number $y^{-1}$ that satisfies $y*y^{-1}=1 \mod p-1$;
raising said public key $g^x \mod p$ to the power y to obtain $g^{xy} \mod p$;

raising g to the power y to form $g^y \mod p$;

encrypting said message M using $g^{xy} \mod p$ to form an encrypted message of the form $\{M\}g^{xy} \mod p$;

storing a copy of said encrypted message $\{M\}g^{xy} \mod p$; and storing a copy of $g^y \mod p$.

29. The method of claim 28 wherein the step of decrypting said blinded and encrypted message by said first node includes the steps of:

selecting a blinding number w having an inverse blinding function $w^{-1}$ that satisfies $w*w^{-1}=1 \mod p-1$;

raising said ephemeral public key $g^x \mod p$ to the power w to obtain $g^{yw} \mod p$;

forwarding $g^{yw} \mod$ to said decryption agent; receiving $g^{xyw} \mod p$ from said decryption agent;

raising $g^{xyw} \mod p$ to the inverse blinding number, $w^{-1}$, to form $g^{xy} \mod p$; and decrypting said encrypted message $\{M\}g^{xy} \mod p$ using $g^{xy} \mod p$ to obtain said message M.

30. The method of claim 28 wherein y is a randomly selected integer.

31. The method of claim 28 wherein w is a randomly selected integer.

32. The method of claim 19 including, prior to said first blinding step, the steps of:

selecting a blinding number y having an inverse blinding number $y^{-1}$;

in a second blinding step, blinding said message M using said blinding number y to form a second blinded message;

forwarding said second blinded message to an encryption agent;

encrypting by said encryption agent said second blinded message to form a second blinded and encrypted message, wherein said ephemeral encryption is performed using said ephemeral encryption function and wherein said ephemeral encryption function and said corresponding ephemeral decryption function are secret symmetric ephemeral encryption and ephemeral decryption keys, respectively;

forwarding said second blinded and encrypted message from said encryption agent to said first node; and in a second unblinding step, unblinding said second blinded and encrypted message using said inverse blinding number $y^{-1}$ to form said encrypted message.

33. The method of claim 32 wherein said second blinding step includes the step of raising said message M to the power $y \mod p$.

34. The method of claim 33 wherein said secret symmetric ephemeral encryption key is a value x and wherein said secret symmetric ephemeral decryption key is $x^{-1}$ and wherein said step of encrypting said second blinded message includes the step of raising said second blinded message $M^y \mod p$ to the power $x \mod p$ to form said second blinded and encrypted message.

35. The method of claim 34 wherein second unblinding step, includes the step of raising said second blinded and encrypted message $M^{xy} \mod p$ to the power $y^{-1} \mod p$, to obtain said encrypted message $M^x \mod p$.

36. The method of claim 35 wherein the step of decrypting said first blinded and encrypted message by said decryption agent includes the step of raising said first blinded and encrypted message to said secret ephemeral decryption key $x^{-1}$ to form a first blinded message $M^z \mod p$.

37. The method of claim 23 wherein said specified event is the occurrence of a predetermined date and time.

38. The method of claim 23 wherein said specified event includes a request by a user to delete said ephemeral decryption key.

39. A system for performing blinded ephemeral decryption of a message, the system comprising: a processor, a memory;

an ephemerizer communicably coupled to a first node via a communications network;

the ephemerizer operative to:

receive from said first node a blinded and encrypted message, said message being encrypted with an encryption key having a corresponding ephemeral decryption key and said message being blinded with a blinding function to form said blinded and encrypted message, wherein said encryption key and said ephemeral decryption key are public and private keys of an ephemeral public key pair, and wherein said ephemeral public and private keys comprise an ephemeral RSA public/private key pair of the form (e,n) and (d,n) respectively, and wherein said blinding function is a blinding function z, and wherein z is a number R having an inverse $R^{-1}$ that satisfies $R*R^{-1}=1 \mod n$;

receive from said first node an ephemeral key ID associated with said ephemeral decryption key;

decrypt said blinded and encrypted message using said ephemeral decryption key to form a blinded message;

communicate said blinded message to said first node; and irretrievably delete said ephemeral decryption key in response to a specified event;

wherein said message being blinded with a blinding function to form said blinded and encrypted message includes the step of forming the first blinded and encrypted message as the product ($R^e * M^e \mod n$) where ($M^e \mod n$) is said message M encrypted using said ephemeral public encryption key.

40. A system for performing blinded ephemeral decryption of a message, the system comprising: a processor, a memory;

an ephemerizer communicably coupled to a first node via a communications network;

means in said ephemerizer for:

receiving from said first node a blinded and encrypted message, said message being encrypted with an encryption key having a corresponding ephemeral decryption key and said message being blinded with a blinding function to form said blinded and encrypted message, wherein said encryption key and said ephemeral decryption key are public and private keys of an ephemeral public key pair, and wherein said ephemeral public and private keys comprise an ephemeral RSA public/private key pair of the form (e,n) and (d,n) respectively, and wherein said blinding function is a blinding function z, and wherein z is a number R having an inverse $R^{-1}$ that satisfies $R*R^{-1}=1 \mod n$;

receiving from said first node an ephemeral key ID associated with said ephemeral decryption key;

decrypting said blinded and encrypted message using said ephemeral decryption key to form a blinded message;

communicating said blinded message to said first node; and irretrievably deleting said ephemeral decryption key in response to a specified event;

wherein said message being blinded with a blinding function to form said blinded and encrypted message includes the step of forming the first blinded and encrypted message as the product ($R^e * M^e$ mod n) where (M.sup.e mod n) is said message M encrypted using said ephemeral public encryption key.

41. A computer program product stored on a computer readable physical storage medium, for use in blinded ephemeral decryption, the computer program product including program code, said computer program code being executable on a processor in an ephemerizer comprising program code for:

receiving from said first node a blinded and encrypted message, said message being encrypted with an encryption key having a corresponding ephemeral decryption key and said message being blinded with a blinding function to form said blinded and encrypted message, wherein said encryption key and said ephemeral decryption key are public and private keys of an ephemeral public key pair, and wherein said ephemeral public and private keys comprise an ephemeral RSA public/private key pair of the form (e,n) and (d,n) respectively, and wherein said blinding function is a blinding function z, and wherein z is a number R having an inverse R.sup.−1 that satisfies R*R.sup.−1=1 mod n;

receiving from said first node an ephemeral key ID associated with said ephemeral decryption key; decrypting said blinded and encrypted message using said ephemeral decryption key to form a blinded message;

communicating said blinded message to said first node; and irretrievably deleting said ephemeral decryption key in response to a specified event;

wherein said message being blinded with a blinding function to form said blinded and encrypted message includes the step of forming the first blinded and encrypted message as the product (R.sup.e*M.sup.e mod n) where (M.sup.e mod n) is said message M encrypted using said ephemeral public encryption key.

42. The method of claim 1 wherein decrypting said blinded and encrypted message is performed by raising the product ((R.sup.e*M.sup.e)mod n) to the power d mod n, forming ((R.sup.e*M.sup.e)mod n)).sup.d mod n to form a first blinded message R*M mod n.

* * * * *